US012607115B2

(12) United States Patent
Bomersbach et al.

(10) Patent No.: US 12,607,115 B2
(45) Date of Patent: Apr. 21, 2026

(54) APPARATUS FOR VERIFYING THE INNER DIAMETER OF TUBULARS FORMING A TUBULAR STRING

(71) Applicants: Dan Todd Bomersbach, Sugarland, TX (US); Danny Joe Richardson, Leesville, LA (US)

(72) Inventors: Dan Todd Bomersbach, Sugarland, TX (US); Danny Joe Richardson, Leesville, LA (US)

( * ) Notice: Subject to any disclaimer, the term of this patent is extended or adjusted under 35 U.S.C. 154(b) by 85 days.

(21) Appl. No.: 18/075,516

(22) Filed: Dec. 6, 2022

(65) Prior Publication Data

US 2023/0109922 A1      Apr. 13, 2023

Related U.S. Application Data

(63) Continuation of application No. 16/754,796, filed as application No. PCT/US2019/059004 on Oct. 31, 2019, now Pat. No. 11,549,363.

(Continued)

(51) Int. Cl.
*E21B 47/08* (2012.01)
*E21B 17/00* (2006.01)
(Continued)

(52) U.S. Cl.
CPC ............ *E21B 47/08* (2013.01); *E21B 17/006* (2013.01); *E21B 23/08* (2013.01); *E21B 37/04* (2013.01);
(Continued)

(58) Field of Classification Search
CPC ........ E21B 47/08; E21B 17/006; E21B 23/08; E21B 7/04; E21B 47/002; E21B 27/00;
(Continued)

(56) References Cited

U.S. PATENT DOCUMENTS 2,257,080 A      9/1941   Turner
2,740,480 A      4/1956   Cox
(Continued)

OTHER PUBLICATIONS

United States Patent and Trademark Office as International Searching Authority for PCT/US2019/059004, Feb. 17, 2020, all pages, United States Patent and Trademark Office, Alexandria, VA, USA.

*Primary Examiner* — Nicole Coy
*Assistant Examiner* — Jennifer A Railey
(74) *Attorney, Agent, or Firm* — LAW OFFICE OF JESSE D. LAMBERT, LLC

(57) ABSTRACT

A floating drift apparatus for verifying the inner diameter of tubulars as the tubulars are made up into a tubular string being run into a wellbore. A float section provides buoyancy to float the apparatus in fluid within the bore of a tubular, and a drift section has a drift element with a diameter substantially equal to the tubular inner diameter being verified, which may be the drift diameter. When running a tubular string, the apparatus is inserted into the bore of the tubular string, floating in the fluid. As joints of tubular are made up and run into the wellbore, the tubulars move downhole around the apparatus. Preferably, the floating drift apparatus can be visually detected. If an undersize ID is encountered, the floating drift apparatus will be pushed downhole and no longer visible; the operator can remove the undersize ID tubular from the string.

21 Claims, 8 Drawing Sheets

Related U.S. Application Data

(60) Provisional application No. 62/810,537, filed on Feb. 26, 2019.

(51) Int. Cl.

| | |
|---|---|
| E21B 23/08 | (2006.01) |
| E21B 37/04 | (2006.01) |
| E21B 47/002 | (2012.01) |
| G01B 3/50 | (2006.01) |
| G01B 5/12 | (2006.01) |
| *E21B 27/00* | (2006.01) |
| *E21B 34/06* | (2006.01) |
| *G01B 5/10* | (2006.01) |

(52) U.S. Cl.
CPC ............. *E21B 47/002* (2020.05); *G01B 3/50* (2013.01); *G01B 5/12* (2013.01); *E21B 27/00* (2013.01); *E21B 34/063* (2013.01); *G01B 5/10* (2013.01)

(58) Field of Classification Search
CPC ........... E21B 34/063; G01B 3/50; G01B 5/12; G01B 5/10
See application file for complete search history.

(56) References Cited

U.S. PATENT DOCUMENTS

| | | | |
|---|---|---|---|
| 4,034,807 | A | 7/1977 | Prince et al. |
| 4,287,948 | A | 9/1981 | Haggard |
| 4,354,379 | A | 10/1982 | Miner |
| 4,427,061 | A | 1/1984 | Moore |
| 5,012,866 | A | 5/1991 | Skipper |
| 5,163,515 | A | 11/1992 | Tailby |
| 5,181,571 | A | 1/1993 | Mueller et al. |
| 5,732,774 | A | 3/1998 | Haggard |
| 6,536,531 | B2 | 3/2003 | Brunet |
| 6,581,453 | B1 | 6/2003 | Bjornstad |
| 7,828,060 | B2 | 11/2010 | Churchill |
| 8,061,053 | B2 | 11/2011 | Gillan |
| 8,925,213 | B2 | 1/2015 | Sallwasser |
| 11,098,554 | B2 | 8/2021 | Brown |
| 12,392,236 | B2 * | 8/2025 | Alarfaj ................... E21B 47/08 |
| 2004/0094305 | A1 | 5/2004 | Skjaerseth et al. |
| 2010/0263441 | A1 | 10/2010 | Gillan |
| 2018/0135398 | A1 | 5/2018 | Entchev et al. |

* cited by examiner

Uppermost End of Floating Drift 10

Connection #2

Rig Floor

Fluid Level

22

Floating Drift 10

Tubular Joint #1

60

20

30

32

100

Connection #1

APPARATUS FOR VERIFYING THE INNER DIAMETER OF TUBULARS FORMING A TUBULAR STRING

CROSS REFERENCE TO RELATED APPLICATIONS

This non-provisional patent application claims priority to U.S. provisional patent application Ser. No. 62/810,537, filed Feb. 26, 2019; and is a continuation of and claims priority to co-pending U.S. non-provisional application Ser. No. 16/754,796, filed Apr. 9, 2020. The disclosure of that provisional patent application is incorporated herein by reference, to the extent not inconsistent with this disclosure.

BACKGROUND

Field of the Invention

This invention relates to apparatus used in connection with the drilling, completion, and servicing of oil and gas wells.

Various types of tubular goods or "tubulars" are run in these wells, including but not limited to drill pipe, smaller diameter strings commonly known as "work strings," tubing strings, and larger diameter "casing," drilling risers, or any tubular member. Almost all of these tubular goods are in sections or "joints," typically on the order of 30 to 40 feet in length. The joints are typically coupled together with threaded connections. Other types of connections are used at times. All of such tubular goods will be collectively referred to at times as "tubulars." The tubulars are coupled or connected together or "made up" into a tubular string, which ultimately are run into a wellbore. Tubulars are often run into a wellbore by a drilling rig having a rig floor at which the tubulars, and/or the tubular string, are landed in slips at the rig floor, as the tubulars are coupled together joint by joint to form a tubular string. For purposes of this application, "tubular" and "tubular string" is intended in its broadest manner, to include but not be limited to all of the above-mentioned tubular members.

Industry standards related to tubulars define an inner "drift diameter" for a given tubular, which may be a function of the tubular outer diameter and wall thickness. The drift diameter, which may be referred to herein as the "drift ID," is the minimum inner diameter ("ID") for a tubular to have, to remain within specifications. It is important that all tubulars run into a wellbore satisfy this inner diameter specification, namely have an inner diameter of at least the drift ID and were not manufactured with a too-small inner diameter; or during transit, handling, makeup in the tubular string or for other reasons the minimum diameter was compromised.

Verifying the inner diameter of the tubulars, in particular the drift ID, within a tubular string is important because (for example) after the tubulars are run into the wellbore, it may be required to run some sort of device down into the tubular string within the wellbore, for example a logging tool, a ball to activate a downhole tool, slickline tools, another smaller diameter tubular, etc. Since the clearances between the outer diameter of such devices and the inner diameter of the tubular in the wellbore may be very close, it is essential to verify that the drift ID of the tubular run into the wellbore is within a desired specification, or the future-run device may not be able to go downhole. In some settings, an ID other than the specification drift ID may be desired to be verified, usually an ID slightly larger than the drift ID. In yet other cases, it may be desired to verify that an ID smaller than the drift ID is in place. In this application, any desired tubular ID may be referred to as a "drift ID."

Traditionally, this ID verification was done by dropping a device known as a "drift" having a known outer diameter down through the tubular, usually on the rig floor, before it was made up into tubular string and run into the wellbore. At times, such device may also be referred to as a "gauge ring," although that term is more properly applied to a device used to ensure a minimum tubular ID other than the drift ID (typically smaller than the drift ID). The drift may take the form of an elongated tool having a ring member with an outer diameter ("OD") equal to or slightly smaller than the drift ID of the tubular. If the drift successfully passed through the tubular, then the inner diameter was deemed satisfactory (i.e. the minimum drift ID was verified). If the drift did not pass through, then that tubular drift ID was undersize and that joint of tubular could not be run into the borehole. Without going into detail, prior art methods of dropping a drift down through a tubular were time consuming. In addition, prior art methods have a high risk for a dropped object event that can result in injury to personnel on the rig floor, or dropping the drift downhole into the wellbore.

Yet another issue exists: it is possible that a given tubular may be of proper drift ID before it is screwed or otherwise connected together into the overall tubular string, hence that tubular would "drift" successfully; yet in the process of screwing the joints of tubular together, which may require substantial torque being placed on the threaded connection, an undersize ID situation may be created at the threaded connection. For example, the connection may be flattened slightly, creating a reduced drift ID section. This situation would however not be known perhaps until the entire tubular string was placed into the wellbore, and when a device with an outer diameter at or near the drift ID was attempted to be run through the tubular string. When that happens, depending upon the location of the undersize ID, the entirety of the tubular string must be removed from the well, at tremendous expense.

In summary, it is important to verify a desired minimum ID, whether that ID is the drift ID or some other ID, of tubulars in a wellbore, preferably after the tubulars have been made up into a tubular string in a wellbore, but as the tubular string is being run. In this manner, ID issues in the tubular string may be detected and resolved in a much more efficient manner.

SUMMARY OF THE INVENTION

The apparatus for verifying inner diameter in a tubular, which may be referred to as a "floating drift apparatus," embodying the principles of the present invention comprises, fundamentally, a floating apparatus and methods of use of same in connection with tubular ID verification, as a tubular string is being run into a wellbore. The floating drift apparatus is typically (but not necessarily) elongated, having a desired outer diameter to verify a desired tubular ID. It is understood that the floating drift apparatus is sufficiently buoyant to float in the wellbore fluid. The floating drift apparatus is placed into the bore of a tubular string being run into a wellbore, where it floats in the wellbore fluid, and moves upwardly (in relative terms) through the tubular string as additional joints of tubular are made up or connected together (typically screwed together) forming the tubular string.

In other embodiments, the floating drift apparatus may comprise a float section and a drift section, the drift section having a drift element (such as a circular ring) with a desired diameter, which may be at or slightly less than the drift ID for a given tubular. The float section has sufficient buoyancy to float the apparatus in a fluid within the bore of a tubular being evaluated (that is, the inner diameter being verified). In one embodiment, the drift section is positioned at or near the lower end of the float section, which may comprise an elongated flotation tube. As noted, the flotation or buoyancy from the flotation tube is sufficient to float the entire apparatus in wellbore fluid. The flotation tube may be 20 to 25 feet long, which is sufficient to extend from the typical fluid level in a tubular being run into a wellbore, out of the uppermost end of the uppermost tubular, which is typically 2 to 3 feet above the rig floor (with the tubular sitting in slips at the rig floor).

To use the apparatus, once the first tubular joint is run and is (typically) sitting in slips in the rotary of the rig (or in a similar setting), the floating drift apparatus is lowered into the bore of the tubular. The floating drift will submerge in the wellbore fluid to an extent, but floats with a portion of the floating drift apparatus below the fluid level in the tubular and the balance extending above the fluid surface. As noted, in one embodiment, the flotation tube is sufficiently long to extend to near the uppermost, open end of the uppermost tubular, and usually to extend beyond the open end by some distance, for example one foot. The floating drift apparatus remains in the bore of the tubular/tubular string.

The next (e.g. the second) joint of tubular is then made up (screwed together or otherwise connected) with the first joint of tubular, and the tubular string lowered to position the second joint in the slips at the rig floor, with the open end of the now-uppermost tubular typically several feet above the rig floor. The floating drift apparatus is still positioned within the bore of the tubular, more-or-less floating at its same location in the fluid, as the tubular string moves downhole around it into the wellbore. It is understood that the fluid level typically remains substantially constant as the tubular string is run into the borehole. In this manner, the floating drift apparatus traverses not only the tube of the tubulars, but also the threaded (or other type of) connections between the joints.

This process is repeated until the entirety of the tubular string is run into the wellbore. The floating drift apparatus, typically extending out of the open end of the uppermost tubular where it can be grasped, can then be simply pulled up out of the tubular string.

If at any time the floating drift apparatus is not at the surface after a joint of tubular has been made up, this indicates that the floating drift apparatus has lodged in a preceding tubular joint (whether in the "tube" or at a connection), due to an undersize ID being encountered; the floating drift apparatus being unable to pass through this spot to remain at the fluid surface. The tubular string can then immediately be lifted only one or two joints (or however many is required), the previous connections unscrewed, and the undersize ID very quickly located and identified. The undersize tubulars can then be removed and proper ones substituted.

It can be understood that some means to detect the presence and/or location of the floating drift apparatus is required; alternative embodiments include a visual detection of the upper end of the floating drift apparatus; a visual detection of a light attached to the floating drift; an audio detection; measurement via sound wave echo location; or other means known in the art. Attachments such as centralizers, junk baskets, scrapers, scratchers, etc. may be added to the floating drift. A fishing neck may be added to the uppermost end of the floating drift apparatus to permit a fishing tool to latch onto the floating drift apparatus to retrieve it from the bore of the tubular string. The floating drift apparatus may comprise one or more rupture disks to protect against excessive fluid pressure.

DESCRIPTION OF THE PRESENTLY PREFERRED EMBODIMENT(S)

Figures 1, 2, 3, 4, 5, 6, 7, 8, 9:
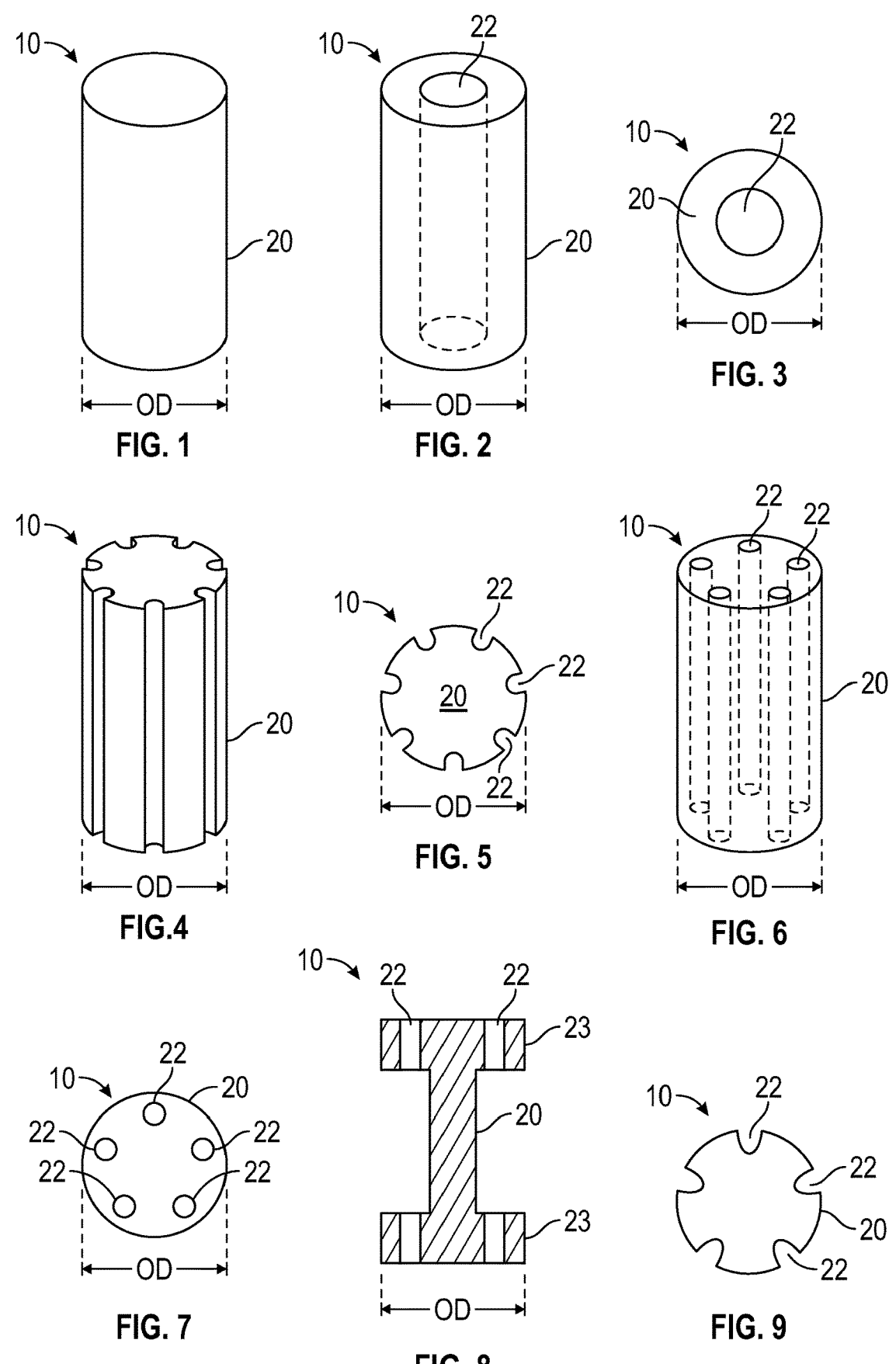
FIGS. 1-9 are views of various embodiments of the floating drift apparatus embodying the principles of the present invention.

With reference to the figures: FIGS. 1-9 show various embodiments of floating drift apparatus 10 (which may be referred to at times as floating drift or drift apparatus), all embodying certain principles of the present invention. Floating drift apparatus 10 fundamentally comprises a body 20 having a sufficient buoyancy force to cause floating drift apparatus 10 to float in a wellbore fluid. Body 20 comprises a desired outer diameter, denoted in the figures as OD. It is understood that OD is selected based on what inner diameter (ID) of the tubular is sought to be verified. Preferably, floating drift apparatus 10 further comprises one or more fluid flow passages 22, whereby fluid can flow by floating drift apparatus 10 when floating drift apparatus 10 is positioned within the bore of a tubular. In FIGS. 2 and 3, flow passage 22 is a longitudinal bore. In FIGS. 4 and 5, flow passages 22 are longitudinal slots positioned around the outer circumference of body 20. In FIGS. 6 and 7, flow passages 22 are a plurality of longitudinal bores through body 20.

Yet other shapes are possible for floating drift apparatus 10. FIGS. 8 and 9 show a generally dumbbell shaped body 20, with longitudinal bores through the enlarged end sections.

Figure 10:
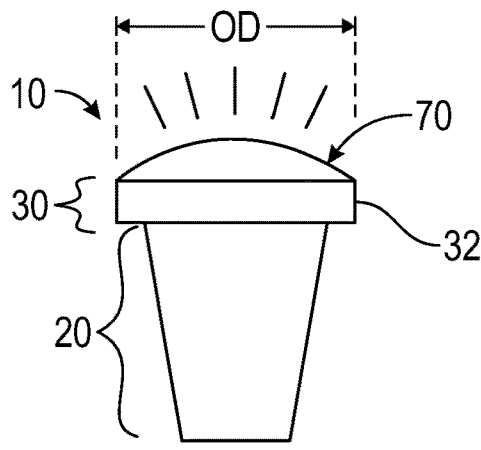
FIGS. 10-12 are other embodiments of the floating drift apparatus.
Figure 11:
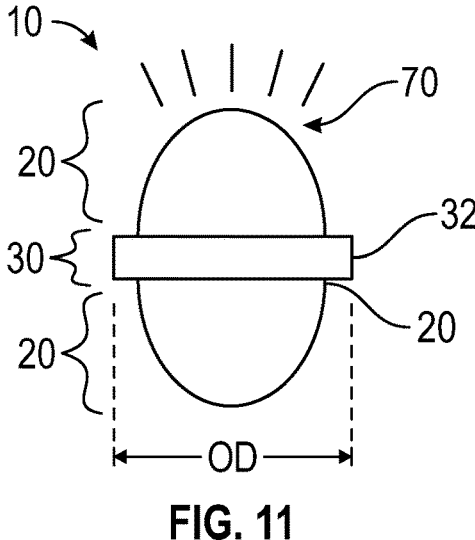
Figure 12:
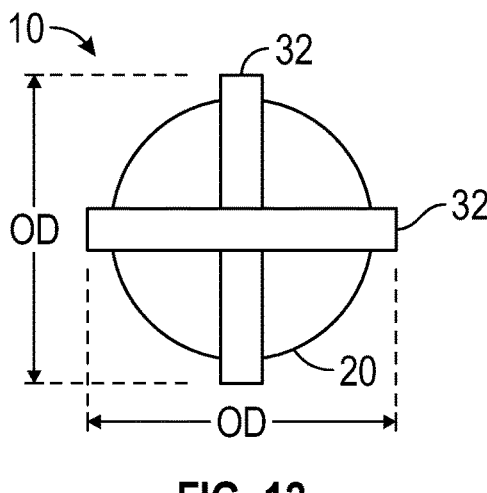

Yet other embodiments of floating drift apparatus 10 are shown in FIGS. 10-12. Certain of these will be discussed in more detail later in this application. FIG. 10 shows a tapered body 20 with a float section 24 and a drift section 30, and a drift element 32 of a desired OD, along with a light 70. FIG. 11 shows an egg-shaped body 20 with drift element 32 of a desired OD. FIG. 12 shows a generally spherical body 20, preferably with two drift elements 32, each of a desired OD.

With reference to the figures, especially FIGS. 14-17, the present invention also comprises a method for verifying the inner diameter of tubulars forming a tubular string, comprising the steps of:

a. lowering one or more joints of tubulars forming a tubular string, into a wellbore containing a fluid, said fluid entering a bore of said tubular string;

b. placing a floating drift apparatus 10 having a desired outer diameter into said bore, floating drift apparatus 10 having sufficient buoyancy to float in the fluid; and c. continuing to connect additional joints of tubulars to said tubular string and to lower the tubular string into said wellbore, floating drift apparatus 10 moving relatively upwardly through the bore of said tubular string as the tubular string is lowered into the wellbore.

Additional Embodiments of the Apparatus and Method of the Present Invention

With reference to FIGS. 13-17, floating drift apparatus 10 comprises a buoyant float section 20 and a drift section 30. Float section 20 may take various forms, but in preferred embodiments is a generally elongated element. Drift section 30 is attached to float section 20, and comprises drift element 32 having a desired dimension, namely outer diameter (OD) as shown, which may be a circular ring with a desired OD. Typically, the OD of drift element 32 is equal to or slightly less than the drift ID of the tubular being evaluated (verification of ID). It is understood that the OD of drift element 32 may be any desired dimension, whether to verify a drift ID or some smaller ID. It is further understood that drift element 32 may be a complete circular or ring shape; or alternatively may be a "broken" ring (having an interrupted circumference) or may have passages through it for fluid flow. It is understood that the buoyancy force from float section 20 is sufficient to float the entire apparatus in wellbore fluid.

Figure 13:
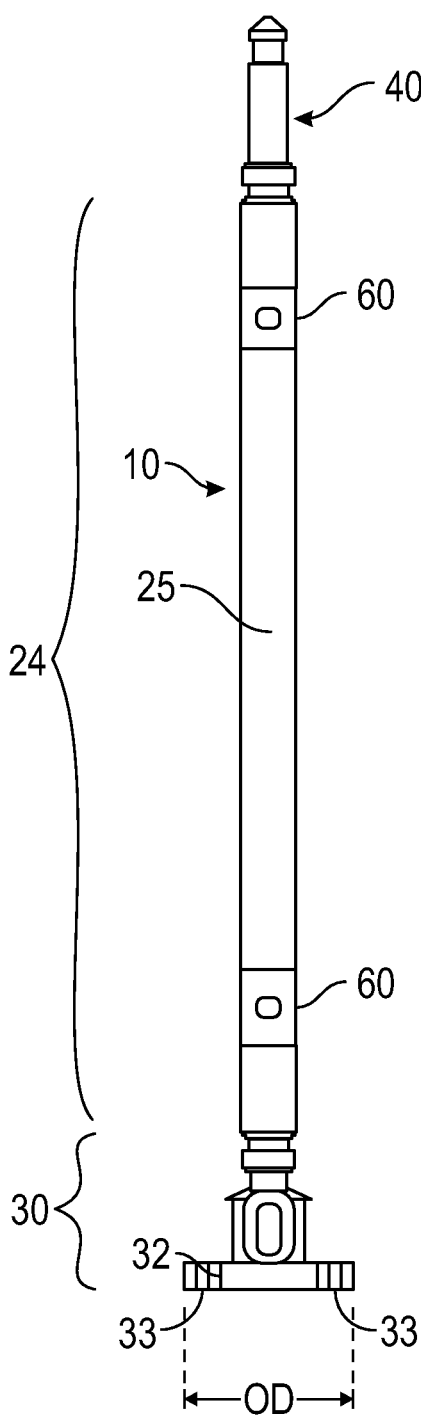
FIG. 13 is a view of another embodiment of a floating drift apparatus embodying the principles of the present invention.

A presently preferred embodiment of floating drift apparatus 10 is shown in FIG. 13. Floating drift apparatus 10 comprises a float section 24 comprising an elongated flotation tube 25, which by way of example may be 20 to 25 feet long. Drift section 30, which is typically connected to a lower end of float section 24, may comprise a drift element 32 having a desired OD. The buoyancy from float section 24 is sufficient to float the entire apparatus in wellbore fluid. The length of flotation tube 25 (as noted, typically 20 to 25 feet long) is preferably sufficient to extend from the typical fluid level in the bore of the tubular in the borehole to at or above the open, upper end of the uppermost tubular joint, which is typically positioned 2 to 3 feet above the rig floor. For example, flotation tube 25 may extend one foot or more out of the upper end of the tubular.

Drift element 32 has a desired OD, typically substantially equal to the drift diameter for the tubular being run, but which may be any desired dimension; for example, the apparatus may be used to verify only a "gauge" inner diameter to ensure safe running of a tool within the tubular, which is typically a diameter smaller than the drift ID. Drift section 30, or drift element 32, may be interchangeable on flotation tube 25.

Additional elements may include rupture discs 60 on flotation tube 25, and a wireline fishing neck 40 on the upper end of float section 20, to permit retrieval or "fishing" of the apparatus if needed. A so-called "junk basket" 50 (see FIG. 6, described in more detail below) may be added, typically to a lower part of floating drift 10. Rupture disk 60 permits fluid to enter the internal portion of flotation tube 25, in the event that floating drift apparatus 10 is subjected to high pressures due to being placed at a greater-than-expected depth in the wellbore fluid, for whatever reason. This feature avoids collapse of flotation tube 25.

An Exemplary Method of Use

Figure 14:
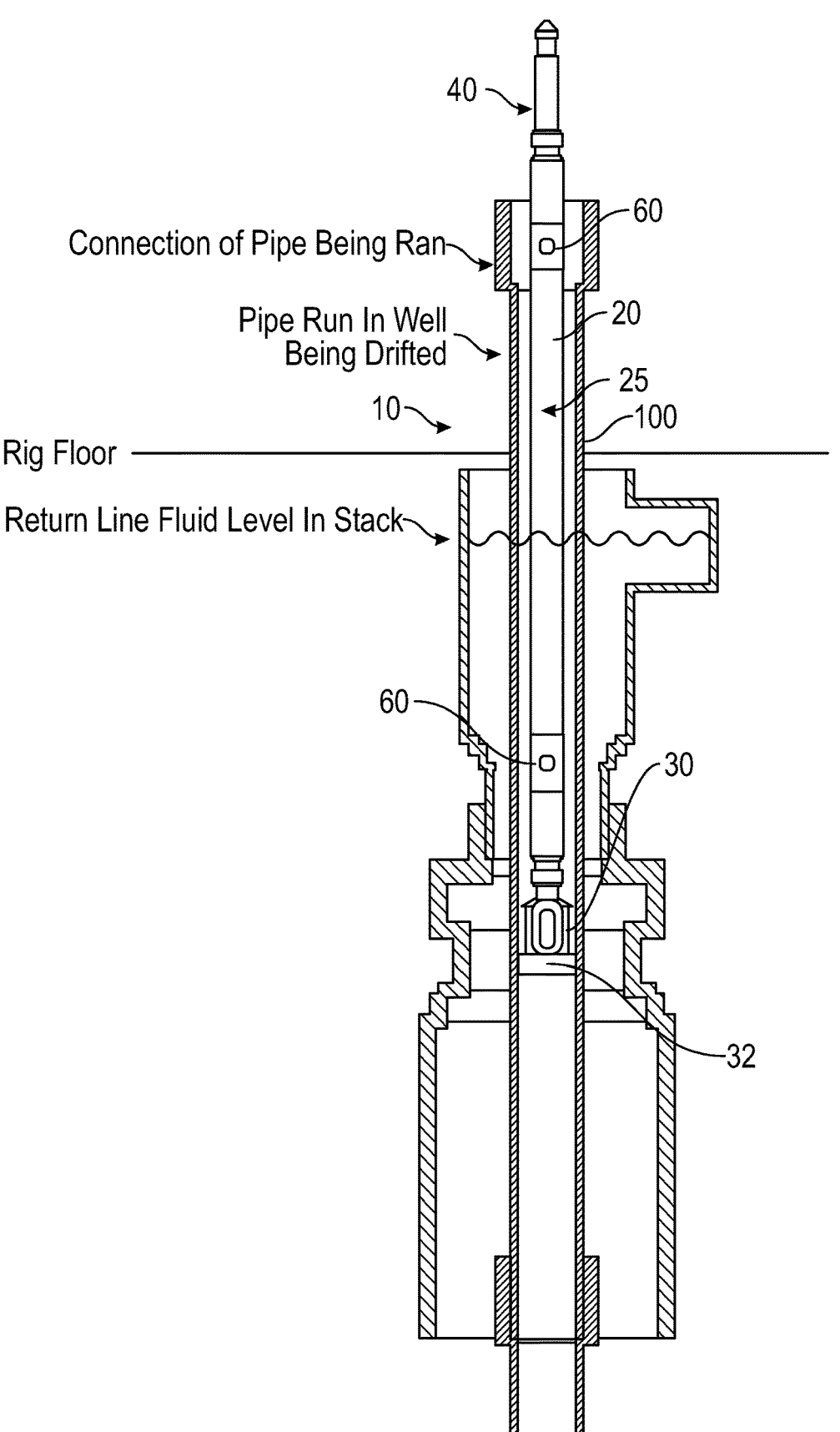
FIG. 14 is a view of the floating drift apparatus positioned within a tubular, with the tubular positioned at the rig floor and extending downwardly into the near-surface wellbore area (e.g. the fluid return equipment).

While the floating drift of the present invention lends itself to various methods of use, with reference to the drawings some of the presently preferred methods can be described. As a general diagram to illustrate an exemplary field setting, FIG. 14 shows floating drift apparatus 10 positioned inside the bore of a tubular which is positioned at the surface, typically in slips in the rig floor, noted in the figure. Various other components of the general setting are also shown in FIG. 14, including an exemplary fluid level within the bore of tubular string 100.

Figure 15:
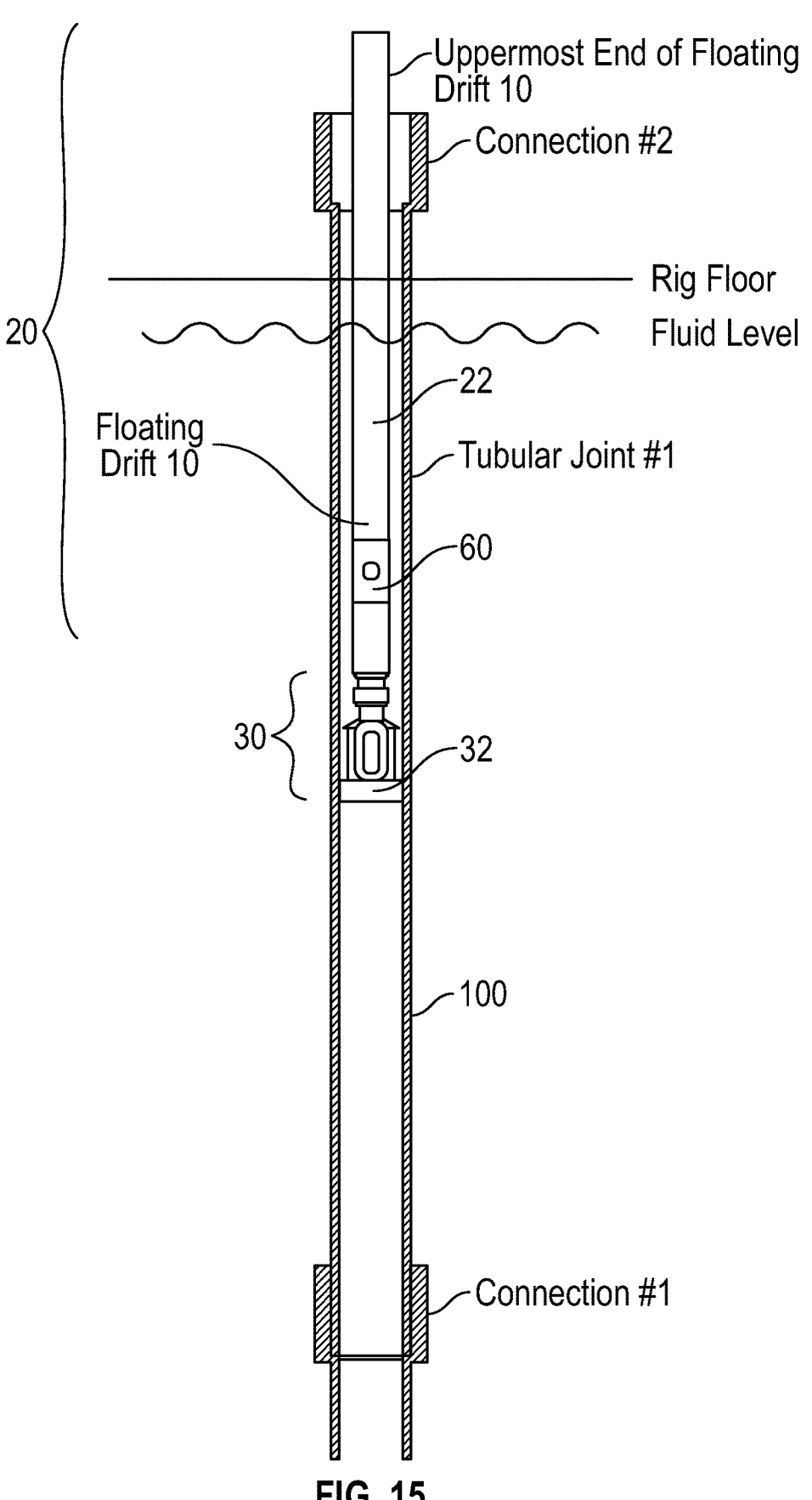
FIGS. 15-17 illustrate a sequence of running several joints of tubular into a wellbore, as the floating drift apparatus remains substantially in the same location, floating in the wellbore fluid.
Figure 16:
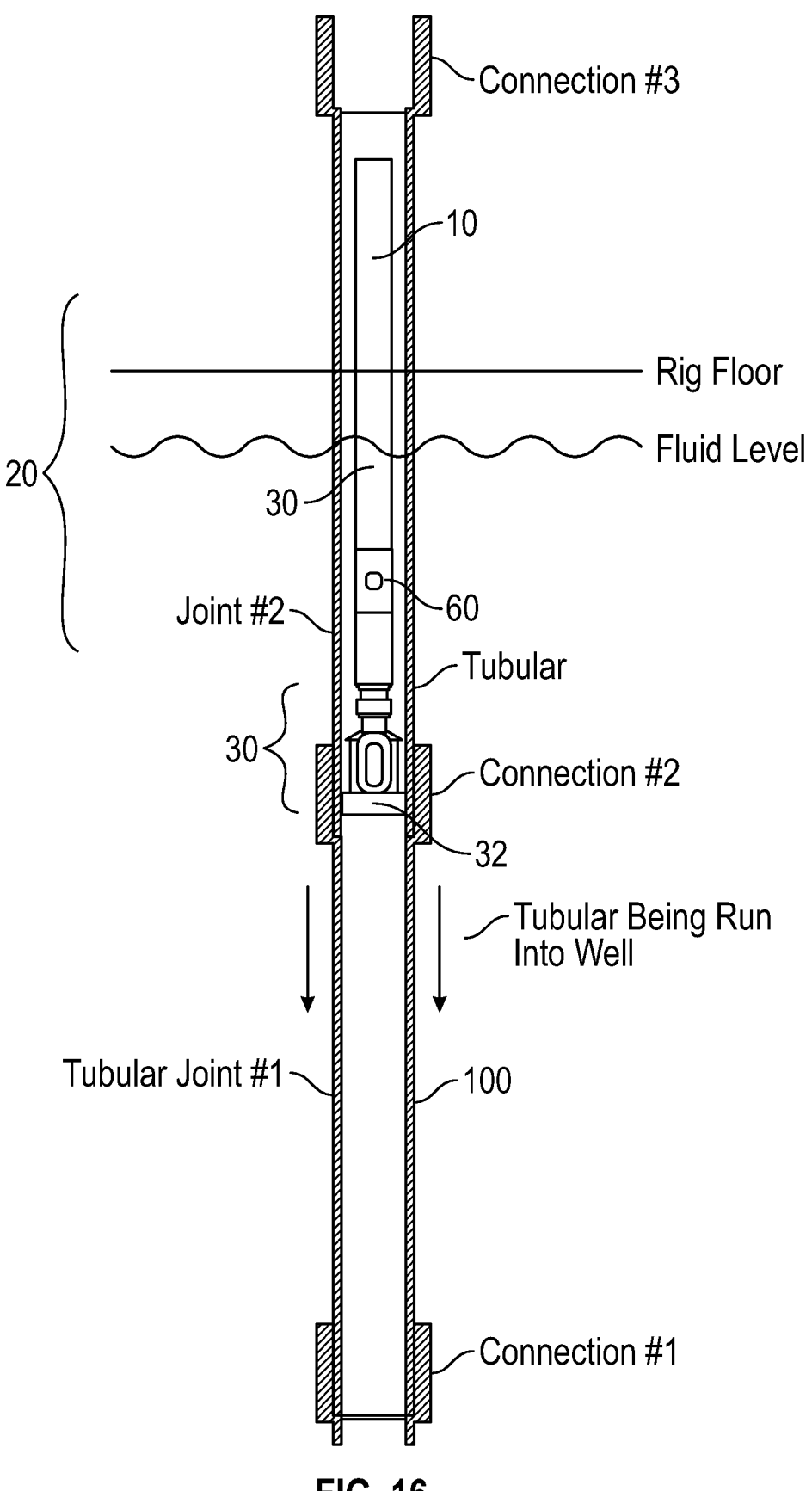
Figure 17:
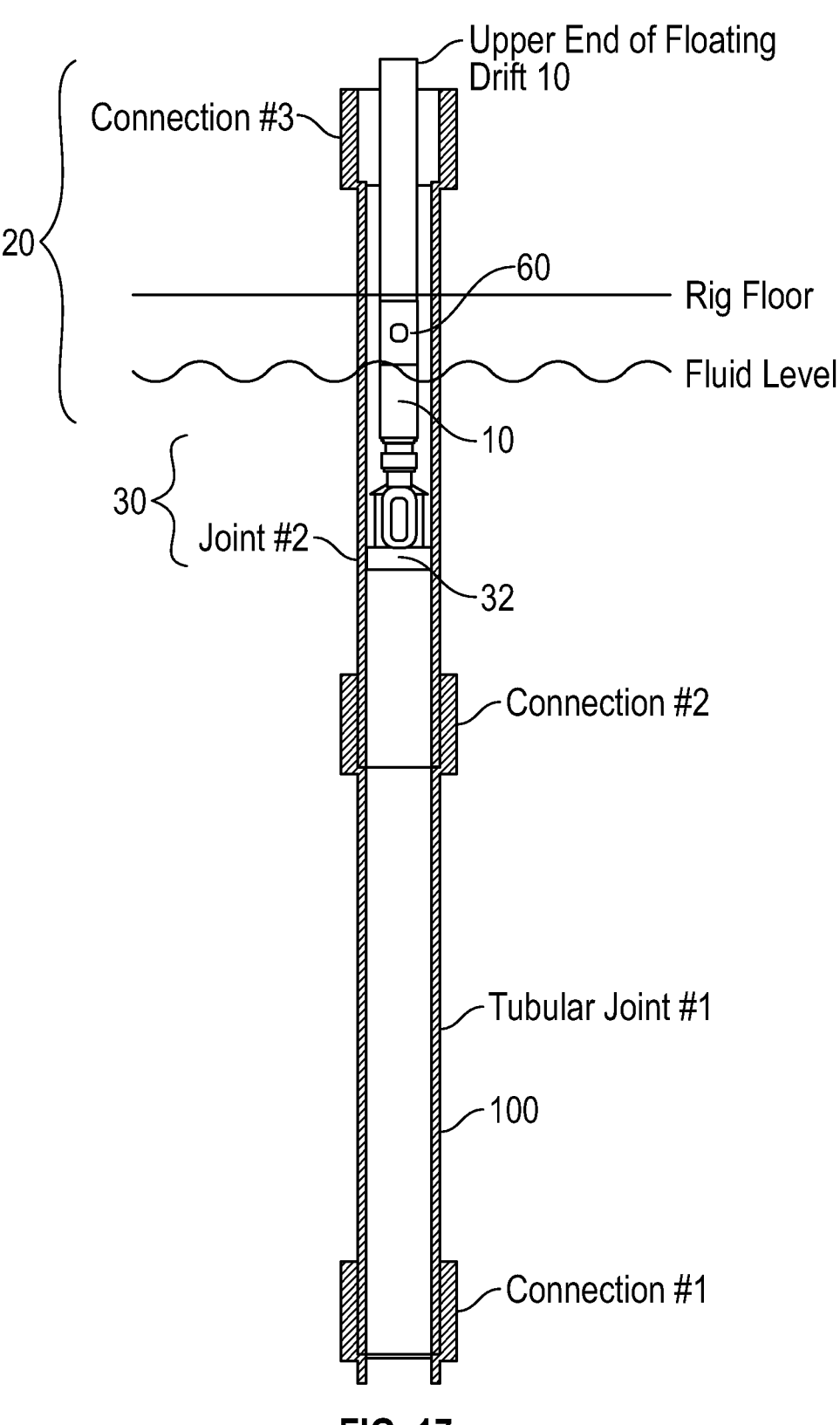

FIGS. 15-17 illustrate a sequence of running tubulars into a borehole with floating drift 10 in place. Certain elements shown in FIG. 14 are omitted for clarity. FIG. 15 illustrates an exemplary starting point of running the tubular string. A first joint of tubular (labeled tubular joint #1) is in place, typically in slips in the rotary. It is understood that multiple joints of tubular are joined or connected together (e.g. by threaded connections) to form a tubular string. The fluid level inside tubular joint #1 is shown, with floating drift 10 floating in the fluid. The lowermost end of the tubular is shown with connection #1 shown (which may take various forms; the notation of connection #1 is primarily for reference purposes). As can be seen, the uppermost end of tubular joint #1 is above the rig floor, and the uppermost end of floating drift apparatus 10 may extend beyond (out of) the uppermost end of tubular joint #1. In FIGS. 15-17, fishing neck 40 is omitted for clarity. FIG. 16 illustrates the next joint of tubular, joint #2, being run into the wellbore. It is understood that joint #2 has been coupled together or connected with joint #1 at connection #2. The fluid level remains more or less constant. The position of floating drift apparatus 10, relative to the rig floor, also remains more or less constant, as the joints of tubular are run downhole around floating drift apparatus 10. FIG. 16 illustrates drift section 30, and more particularly drift element 32, passing through connection #2. It can be understood that in the position shown in FIG. 16, drift element 32 has passed through joint #1, is passing through connection #2, and will be passing through joint #2 (i.e. the tube thereof), thereby verifying the proper ID of those tubulars and the connections between them.

FIG. 16 shows joint #2 in place in slips at the rig floor. The uppermost end of floating drift apparatus 10 is extending beyond the uppermost end of joint #2, thereby verifying that drift section 30/drift element 32 has passed through joint #1 and connection #2, and at least a portion of joint #2.

This described sequence is repeated as the remainder of the tubular string is run into the wellbore. It can be understood that in this manner, the ID of the entirety of the tubular string can be verified.

Figure 18:
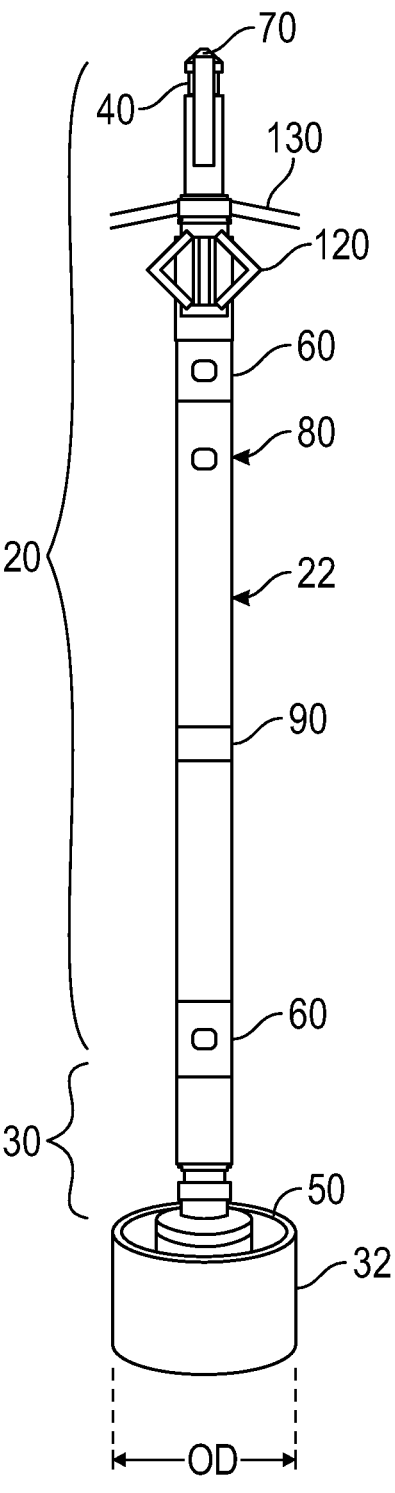
FIG. 18 is another embodiment of the floating drift apparatus.

It is to be understood that in a preferred embodiment floating drift apparatus 10 comprises some means to allow an operator to detect or verify the presence/location of floating drift apparatus 10 within the tubular. In some embodiments, the means for detecting or verifying the location of floating drift apparatus 10 is a simple visual one, by the operator seeing floating drift 10, whether or not floating drift apparatus 10 extends out of the uppermost end of the tubular. Other means for detecting the location of floating drift apparatus 10 include an indicator light 70, see FIGS. 10, 11 and 18 as examples. Indicator light 70 may be a battery powered light known in the relevant field.

Another embodiment of floating apparatus drift 10 is shown in FIG. 6. As noted above, in this embodiment, floating drift apparatus 10 comprises an indicator light 70 at its uppermost end. Still further optional/supplemental means for detecting the presence of floating drift apparatus 10 include electronic devices, e.g. Wifi, RFID or similar devices, denoted generally as 80. Still other means may include echo location, denoted schematically as 90. Equipment for implementing these means for detection are known in the relevant art. Floating drift apparatus 10 may further comprise centralizer 120, a junk basket 50; or wire scrapers/ scratchers, denoted generally as 130; and/or a magnet.

Materials

Materials for floating drift apparatus 10 are commonly known in the relevant industry, including high strength steel, non-ferrous, non-metallic seal elements if required, etc. Methods of manufacturing would include those commonly used for similar apparatus.

Other Embodiments

Various apparatus for verifying inner dimensions of tubulars can embody the principles of the present invention. FIG. 10 shows an embodiment in which float section 20 is generally disposed below drift element 30, when the apparatus is in place within the bore of a tubular. An indicator light 70, which may be battery powered, may be disposed on floating drift 10 and positioned so as to be visible from above. An operator can then visually detect the location of floating drift 10 even though floating drift apparatus 10 does not extend out of the tubular string. With this embodiment, retrieval of floating drift 10 may be by a magnet or other means.

Yet another embodiment is shown in FIG. 11, in which float section 20 is a generally oblong shape on which drift section 30, including drift element 32, is connected.

Still another embodiment is shown in FIG. 12, in which floating drift apparatus 10 generally takes the form of a sphere having a desired diameter. In this embodiment float section 20 and drift section 30 are effectively merged into one, comprising one or more drift elements 32 so as to provide the drift ID verification regardless of orientation of floating drift 10 within the bore of the tubular.

Conclusion

It is understood that the foregoing description presents various embodiments of the present invention, by way of example and not limitation. Various changes can be made to the apparatus and methods embodying the principles of the invention. Therefore, the scope of the invention is not limited by the foregoing examples, but by the appended claims and the legal equivalents thereof.

We claim:

1. A floating drift apparatus, comprising:
   a body having a sufficient buoyancy force to cause said floating drift apparatus to float in a wellbore fluid, said body comprising an outer diameter, said drift apparatus further comprising one or more fluid flow passages whereby fluid can flow by said drift apparatus when said drift apparatus is positioned within the bore of a tubular, wherein said outer diameter of said body is substantially equal to a minimally acceptable diameter of said bore of said tubular, and further comprising an element enabling visual detection of a position of said floating drift apparatus within a bore of a tubular string, wherein said visual detection is made from an uppermost end of said tubular string.

2. The floating drift apparatus of claim 1, wherein said body is elongated, and wherein said flow passages comprise one or more bores through a length of said body.

3. The floating drift apparatus of claim 1, wherein said body is elongated, and wherein said flow passages comprise one or more elongated grooves along a length of said body.

4. The floating drift apparatus of claim 1, wherein said means for visually detecting comprises an uphole-directed extension of sufficient length to be seen when said floating drift apparatus is in a tubular string bore, and said tubular string is being lowered into a wellbore.

5. The floating drift apparatus of claim 1, wherein said means for visually detecting comprises a light source.

6. An apparatus for verifying the inner diameter of a tubular, comprising:
   a float section, said float section sufficiently buoyant to float said apparatus in a fluid within a bore of said tubular; and
   a drift section attached to said float section, said drift section comprising a drift element having a desired diameter,
   wherein said float section comprises an elongated tubular member having a length sufficient to extend out of the uppermost tubular in a tubular string being run into a wellbore, when said apparatus is positioned within said bore of said tubular string, said bore of said tubular string containing fluid therein and said apparatus floating in said fluid.

7. The apparatus of claim 6, further comprising a light source attached to said apparatus.

8. The apparatus of claim 7, wherein said drift element is detachably connected to said drift section, whereby a drift element having a diameter suitable for a particular tubular may be connected.

9. The apparatus of claim 8, wherein said apparatus further comprises a junk basket connected thereto.

10. The apparatus of claim 6, wherein said desired diameter of said drift element is substantially equal to a drift diameter of said tubular.

11. The apparatus of claim 10, further comprising a light attached proximal an upper end of said float section.

12. An apparatus adapted to verify the drift diameter of tubulars comprising a tubular string, while said tubular string is being run into a wellbore containing a fluid, comprising:
    an elongated buoyant float section having an upper end and a lower end, said float section having sufficient buoyant force to float said apparatus in said fluid; and
    a drift section attached to said lower end of said float section, said drift section comprising a drift element having a desired diameter relative to said drift diameter,
    wherein said desired diameter of said drift element is sufficiently small to prevent contact between said body and said bore of said tubulars, around an entirety of a circumference of said bore of said tubulars.

13. The apparatus of claim 12, wherein said float section is sufficiently long to extend out of the uppermost tubular in said tubular string, while said apparatus is positioned in a bore of said tubular string and said tubular string is being lowered into a wellbore.

14. The apparatus of claim 12, further comprising a battery powered light proximal said upper end of said float section.

15. The apparatus of claim 12, further comprising one or more rupture disks disposed on said float section.

16. The apparatus of claim 12, further comprising a junk basket.

17. The apparatus of claim 12, further comprising an electronic device for determining the location of said apparatus.

18. The apparatus of claim 17, wherein said electronic device comprises Wifi or RFID transmitter.

19. The apparatus of claim 12, further comprising a fishing neck at an uppermost end of said apparatus.

20. The apparatus of claim 19, further comprising a centralizer.

21. The apparatus of claim 20, further comprising a scraper/scratcher element.

* * * * *